(12) United States Patent
Toyoda et al.

(10) Patent No.: US 9,885,895 B2
(45) Date of Patent: Feb. 6, 2018

(54) IMAGE DISPLAY DEVICE AND PRODUCTION METHOD THEREOF

(71) Applicant: DEXERIALS CORPORATION, Tokyo (JP)

(72) Inventors: Tomoyuki Toyoda, Tochigi (JP); Yoshihisa Shinya, Tochigi (JP); Yusuke Kamata, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 14/859,678

(22) Filed: Sep. 21, 2015

(65) Prior Publication Data

US 2016/0011454 A1    Jan. 14, 2016

Related U.S. Application Data

(60) Continuation of application No. 14/260,907, filed on Apr. 24, 2014, now abandoned, which is a division of
(Continued)

(30) Foreign Application Priority Data

Jul. 17, 2007 (JP) ................................ 2007-186360
Jan. 11, 2008 (JP) .................................... 2008-5027
Apr. 10, 2008 (JP) ................................ 2008-102051

(51) Int. Cl.
*G02F 1/1333* (2006.01)

(52) U.S. Cl.
CPC ...... *G02F 1/133308* (2013.01); *G02F 1/1333* (2013.01); *G02F 2001/13332* (2013.01);
(Continued)

(58) Field of Classification Search
CPC .............. G02F 1/133308; G02F 2001/133311
See application file for complete search history.

(56) References Cited

U.S. PATENT DOCUMENTS

| | | | |
|---|---|---|---|
| 4,679,918 | A | 7/1987 | Ace |
| 5,073,477 | A | 12/1991 | Kusuda et al. |

(Continued)

FOREIGN PATENT DOCUMENTS

| | | | |
|---|---|---|---|
| CN | 1609943 A | 4/2005 | |
| CN | 1661447 A | 8/2005 | |

(Continued)

OTHER PUBLICATIONS

Mar. 29, 2013 Office Action issued in Korean Patent Application No. 2010-7000882.
(Continued)

*Primary Examiner* — Sang V Nguyen
(74) *Attorney, Agent, or Firm* — Oliff PLC

(57) ABSTRACT

An image display device, and a production method thereof are provided, which maximize suppression of warping of a protective panel. A liquid crystal display panel and a transparent protective panel formed from a plastic are arranged facing each other via a cured resin. An outer dimension of the protective panel is made larger than an outer dimension of the display panel. Curing is carried out with an edge of the protective panel fixed with a fixing jig during and after curing. Alternatively, the outer dimension of the protective panel is substantially equal to an outer dimension of the display panel, which is substantially equal to an inner dimension of a case and the protective panel. Curing is carried out with the resin composition in contact with substantially the whole face of the protective panel.

12 Claims, 2 Drawing Sheets

Related U.S. Application Data application No. 12/452,275, filed as application No. PCT/JP2008/062866 on Jul. 16, 2008, now abandoned.

(52) U.S. Cl.
CPC ............ *G02F 2001/133311* (2013.01); *G02F 2001/133325* (2013.01); *G02F 2001/133331* (2013.01); *G02F 2201/50* (2013.01); *G02F 2201/503* (2013.01); *G02F 2201/54* (2013.01); *G02F 2202/28* (2013.01)

(56) References Cited

U.S. PATENT DOCUMENTS

| | | | |
|---|---|---|---|
| 5,126,620 A | 6/1992 | Haraga et al. | |
| 6,204,896 B1 | 3/2001 | Matsuhira et al. | |
| 6,414,781 B1 | 7/2002 | Saitoh | |
| 6,461,709 B1 | 10/2002 | Janssen et al. | |
| 6,950,236 B2 | 9/2005 | Hokazono et al. | |
| 7,382,422 B2 | 6/2008 | Niiyama et al. | |
| 7,499,130 B2 | 3/2009 | Tsai et al. | |
| 7,982,826 B2 * | 7/2011 | Hirakata | G02B 1/105 349/112 |
| 8,859,633 B2 | 10/2014 | Oshima et al. | |
| 2002/0131141 A1 * | 9/2002 | Saitoh | G02F 1/133308 359/245 |
| 2002/0154254 A1 | 10/2002 | Tasaki et al. | |
| 2003/0087054 A1 | 5/2003 | Janssen et al. | |
| 2003/0199601 A1 | 10/2003 | Chang et al. | |
| 2004/0180148 A1 | 9/2004 | Hieda et al. | |
| 2005/0083465 A1 | 4/2005 | Niiyama et al. | |
| 2005/0126697 A1 | 6/2005 | Kuczynski | |
| 2005/0190335 A1 | 9/2005 | Maruyama et al. | |
| 2005/0249932 A1 | 11/2005 | Wang et al. | |
| 2006/0062938 A1 | 3/2006 | Takeko et al. | |
| 2006/0110549 A1 * | 5/2006 | Wang | B32B 23/08 428/1.3 |
| 2006/0159867 A1 | 7/2006 | O'Donnell | |
| 2007/0065091 A1 * | 3/2007 | Hinata | G02F 1/133308 385/147 |
| 2007/0141244 A1 | 6/2007 | Bell et al. | |
| 2007/0222911 A1 * | 9/2007 | Murase | G02F 1/13452 349/58 |
| 2008/0002093 A1 * | 1/2008 | Kim | G02B 6/0086 349/58 |
| 2009/0128767 A1 | 5/2009 | Suezaki et al. | |
| 2009/0283211 A1 | 11/2009 | Matsuhira | |
| 2009/0296033 A1 * | 12/2009 | Shinya | C08F 290/06 349/122 |
| 2009/0310057 A1 * | 12/2009 | Kang | G02F 1/133615 349/58 |
| 2009/0322983 A1 * | 12/2009 | Hashino | G02F 1/133615 349/61 |
| 2011/0265934 A1 | 11/2011 | Oshima et al. | |

FOREIGN PATENT DOCUMENTS

| | | |
|---|---|---|
| CN | 1936663 A | 3/2007 |
| CN | 101681571 B | 3/2013 |
| EP | 0 789 295 A1 | 8/1997 |
| EP | 1 634 910 A1 | 3/2006 |
| EP | 2 051 227 A1 | 4/2009 |
| JP | H02-165188 A | 6/1990 |
| JP | H03-204616 A | 9/1991 |
| JP | H06-75701 A | 3/1994 |
| JP | H06-299126 A | 10/1994 |
| JP | H06-337411 A | 12/1994 |
| JP | H07-13173 A | 1/1995 |
| JP | H07-64282 A | 3/1995 |
| JP | H08-122759 A | 5/1996 |
| JP | H08-160407 A | 6/1996 |
| JP | H08-211353 A | 8/1996 |
| JP | H08-220554 A | 8/1996 |
| JP | H08-328023 A | 12/1996 |
| JP | H09-087593 A | 3/1997 |
| JP | H09-259770 A | 10/1997 |
| JP | H-09-274536 A | 10/1997 |
| JP | H09-318932 A | 12/1997 |
| JP | H10-81956 A | 3/1998 |
| JP | H10-83247 A | 3/1998 |
| JP | H10-95967 A | 4/1998 |
| JP | H10-293314 A | 11/1998 |
| JP | 2000-073025 A | 3/2000 |
| JP | 2000-111908 A | 4/2000 |
| JP | 2000-219868 A | 8/2000 |
| JP | 2000-258780 A | 9/2000 |
| JP | 2000-267118 A | 9/2000 |
| JP | 2000-284700 A | 10/2000 |
| JP | 2001026759 A | 1/2001 |
| JP | 2001-037868 A | 2/2001 |
| JP | 2001-141907 A | 5/2001 |
| JP | 3220403 B2 | 10/2001 |
| JP | 2002-019013 A | 1/2002 |
| JP | 2002-052552 A | 2/2002 |
| JP | 2002-092957 A | 3/2002 |
| JP | 2002-258268 A | 9/2002 |
| JP | 2002-528298 A | 9/2002 |
| JP | 2002-309199 A | 10/2002 |
| JP | 2002-323861 A | 11/2002 |
| JP | 2002-348150 A | 12/2002 |
| JP | 2002-543545 A | 12/2002 |
| JP | 2003-003150 A | 1/2003 |
| JP | 2003-029644 A | 1/2003 |
| JP | 2003-096425 A | 4/2003 |
| JP | 2003-150065 A | 5/2003 |
| JP | 2003-207790 A | 7/2003 |
| JP | 2003-295780 A | 10/2003 |
| JP | 2004-009665 A | 1/2004 |
| JP | 2004-029711 A | 1/2004 |
| JP | 2004-077887 A | 3/2004 |
| JP | 2004-115757 A | 4/2004 |
| JP | 2004-117545 A | 4/2004 |
| JP | 2004-169023 A | 6/2004 |
| JP | 2004-170907 A | 6/2004 |
| JP | 2004-212521 A | 7/2004 |
| JP | 2004-224855 A | 8/2004 |
| JP | 2004-256595 A | 9/2004 |
| JP | 2004-271935 A | 9/2004 |
| JP | 2004-279946 A | 10/2004 |
| JP | 2004-325788 A | 11/2004 |
| JP | 2004-359769 A | 12/2004 |
| JP | 2005-023315 A | 1/2005 |
| JP | 2005-055641 A | 3/2005 |
| JP | 2005-076017 A | 3/2005 |
| JP | 2005-154581 A | 6/2005 |
| JP | 2005-179481 A | 7/2005 |
| JP | 2005-225127 A | 8/2005 |
| JP | 2005-234129 A | 9/2005 |
| JP | 2005-283749 A | 10/2005 |
| JP | 2005-314687 A | 11/2005 |
| JP | 2005-315901 A | 11/2005 |
| JP | 2006-011212 A | 1/2006 |
| JP | 2006-053425 A | 2/2006 |
| JP | 2006-053531 A | 2/2006 |
| JP | 2006-058753 A | 3/2006 |
| JP | 2006-113435 A | 4/2006 |
| JP | 2006-150755 A | 6/2006 |
| JP | 2006-154758 A | 6/2006 |
| JP | 2006-159412 A | 6/2006 |
| JP | 2006-189715 A | 7/2006 |
| JP | 2006-221187 A | 8/2006 |
| JP | 2006-267502 A | 10/2006 |
| JP | 2006-276105 A | 10/2006 |
| JP | 2006-277828 A | 10/2006 |
| JP | 2006-282911 A | 10/2006 |
| JP | 2006-292993 A | 10/2006 |
| JP | 2006-298964 A | 11/2006 |
| JP | 2006-308866 A | 11/2006 |
| JP | 2006-342222 A | 12/2006 |
| JP | 2007-009115 A | 1/2007 |
| JP | 2007-010769 A | 1/2007 |
| JP | 2007-023147 A | 2/2007 |

(56) References Cited

FOREIGN PATENT DOCUMENTS

| | | |
|---|---|---|
| JP | 2007-041534 A | 2/2007 |
| JP | 2007-077321 A | 3/2007 |
| JP | 2007-108592 A | 4/2007 |
| JP | 2007-114737 A | 5/2007 |
| JP | 2007-140220 A | 6/2007 |
| JP | 2007-156066 A | 6/2007 |
| JP | 2007-249038 A | 9/2007 |
| JP | 2007-298667 A | 11/2007 |
| JP | 2007293324 A | 11/2007 |
| JP | 2008019402 A | 1/2008 |
| JP | 2008-507617 A | 3/2008 |
| JP | 2008-129159 A | 6/2008 |
| JP | 2015-163991 A | 9/2015 |
| JP | 2015-187742 A | 10/2015 |
| KR | 2002-0030852 A | 4/2002 |
| KR | 10-2005-0067162 A | 6/2005 |
| KR | 10-2007-033920 A | 3/2007 |
| TW | 567338 B | 12/2003 |
| TW | 2007-04704 A | 2/2007 |
| TW | I395011 B | 5/2013 |
| WO | 00/65409 A2 | 11/2000 |
| WO | 2006/011461 A1 | 2/2006 |
| WO | 2006/100788 A1 | 9/2006 |
| WO | 2006/129665 A1 | 12/2006 |
| WO | 2006/129678 A1 | 12/2006 |
| WO | 2007/063751 A1 | 6/2007 |
| WO | 2007/066590 A1 | 6/2007 |
| WO | WO/2008/007800 * 7/2007 ............... G09F 9/00 |
| WO | 2008/007800 A1 | 1/2008 |

OTHER PUBLICATIONS

May 7, 2013 Office Action issued in Japanese Patent Application No. 2008-101983.
May 7, 2013 Office Action issued in Japanese Patent Application No. 2008-100879.
May 30, 2013 Office Action issued in Korean Patent Application No. 2012-7007367.
Feb. 20, 2013 Notification of Reason(s) for Refusal issued in Japanese Patent Application No. 2008-098342.
Nov. 16, 2012 Submission of Publications and the like issued in Japanese Application No. 2008-100891.
Jul. 2, 2013 Notification of Reason(s) for Refusal issued in Japanese Patent Application No. 2008-100891.
Jul. 16, 2013 Notification of Reason(s) for Refusal issued in Japanese Patent Application No. 2012-105372.
Aug. 15, 2012 Office Action issued in Japanese Patent Application No. 2008-185415.
Dec. 26, 2012 Notification of Reason(s) for Refusal issued in Japanese Application No. 2008-105198.
Dec. 26, 2012 Notification of Reason(s) for Refusal issued in Japanese Application No. 2012-105372.
Nov. 30, 2012 Office Action issued in Chinese Patent Application No. 200880024815.6.
Sep. 20, 2012 Office Action issued in Taiwanese Patent Application No. 097127147.
Jul. 4, 2012 Trial Decision of Japanese Patent Application No. 11-38529 (Dissatisfaction No. 2009-14917).
Oct. 22, 2012 Submission of Publications and the like filed in Japanese Patent Application No. 2008-98342.
May 13, 2008 Notification of Reasons for Refusal for Japanese Patent Application No. 10-240922.
Oct. 24, 2012 Submission of Publications and the like filed in Japanese Patent Application No. 2008-105198.
Jul. 18, 2012 Extended European Search Report issued in European Patent Application No. 11009604.7.
Jul. 13, 2012 Korean Office Action issued in Korean Patent Application No. 2012-7007367.
Jul. 11, 2011 Submission of Publications and the like issued in Japanese Patent Application No. 2008-105198.
Dec. 13, 2011 Submission of Publications and the like submitted in Japanese Patent Application No. 2008-105198.
Dec. 30, 2011 Submission of Publications and the like submitted in Japanese Patent Application No. 2008-101101.
Dec. 30, 2011 Submission of Publications and the like submitted in Japanese Patent Application No. 2008-100891.
Jan. 13, 2012 Submission of Publications and the like submitted in Japanese Patent Application No. 2008-98342.
Japanese Patent Application No. 2007-186360 filed Jul. 17, 2007.
Japanese Patent Application No. 2008-005027 filed Jan. 11, 2008.
Japanese Patent Application No. 2007-102252 filed Apr. 9, 2007.
Japanese Patent Application No. 2006-193730 filed Jul. 14, 2006.
Japanese Patent Application No. 2007-102251 filed Apr. 9, 2007.
Aug. 6, 2008 Notification of Reasons for Refusal in Japanese Patent Application No. Hei 11-038529.
May 18, 2009 Decision of Refusal in Japanese Patent Application No. Hei 11-038529.
Oct. 16, 2009 Preliminary report in Japanese Patent Application No. Hei 11-038529.
Dec. 26, 2008 Notification of Reason(s) for Refusal in Japanese Patent Application No. Hei 11-038529.
The Committee of Kagaku Daijiten, eds., "Kagaku Daijiten 2," p. 375, Kyoritsu Shuppan Co., Ltd. Jul. 15, 2006.
Akira Matsumura, ed., "Daijirin," p. 449, Sanseido Publishing Co. Ltd., Nov. 3, 1988.
The Committee of Shogakukan Daijisen, eds. "Daijisen," p. 492, Shogakukan Inc., Dec. 1, 1995.
Feb. 29, 2012 Notification of Reason(s) for Refusal issued in Japanese Patent Application No. 2008-105198.
May 11, 2011 Office Action issued in Chinese Application No. 200880024844.2.
Jun. 30, 2010 European Search Report issued in European Patent Application No. 08 79 1186.3.
Jan. 17, 2010 Written Opinion of the International Search Authority issued in International Application No. PCT/JP2008/062791.
Jan. 14, 2009 Written Opinion of the International Searching Authority issued in International Application No. PCT/JP2007/064120.
U.S. Appl. No. 12/452,329, filed Dec. 24, 2009 in the name of Toyoda et al.
Aug. 19, 2008 International Search Report received in International Application No. PCT/JP2008/062866.
Jul. 6, 2011 Submission of Publications and the like issued in Japanese Patent Application No. 2008-98342.
May 11, 2012 Examination Report in Taiwanese Patent Application No. 97127146.
Feb. 20, 2012 Submission of Publications and the like submitted in Japanese Patent Application No. 2008-101101.
Feb. 20, 2012 Submission of Publications and the like submitted in Japanese Patent Application No. 2008-100891.
Feb. 24, 2012 Office Action issued in Taiwanese Patent Application No. 097127147.
Apr. 5, 2012 Office Action issued in Chinese Patent Application No. 200880024815.6.
Aug. 19, 2008 Office Action issued in International Patent Application No. PCT/JP2008/062866.
Dec. 12, 2014 European Search Report issued in European Application No. 14002672.5.
Dec. 24, 2014 Notification of Reason(s) for Refusal issued in Japanese Application No. 2014-022038.
Dec. 2, 2014 First Office Action issued in Chinese Application No. 201310103458.5.
Jan. 15, 2015 Submission of Publications and the like issued in Japanese Application No. 2013-215621.
Jan. 21, 2015 Submission of Publications and the like issued in Japanese Application No. 2013-215621.
Feb. 3, 2015 Office Action issued in Taiwanese Application No. 101130952.
Mar. 27, 2015 Office Action issued in Taiwainese Application No. 102112670.
Apr. 2, 2015 Office Action issued in Korean Application No. 2015-7001682.
Mar. 27, 2015 Office Action issued in Taiwanese Patent Application 102112670.

(56) References Cited

OTHER PUBLICATIONS

May 7, 2015 Office Action issued in Japanese Application No. 2014-132099.
Jun. 4, 2015 Office Action issued in Korean Application No. 2015-7008267.
May 19, 2015 Office Action issued in Japanese Application No. 2013-215621.
Jul. 20, 2015 Office Action issued in European Application No. 08 740 108.9.
May 21, 2015 Office Action issued in Taiwanese Application No. 103112478.
Jul. 13, 2015 Office Action issued in Taiwanese Application No. 102112670.
Jun. 3, 2015 Office Action issued in Chinese Application No. 201310578940.4.
Oct. 18, 2013 Notice of Grounds for Rejection issued in Korean Application No. 2013-7020373.
Oct. 28, 2014 Notice of Final Rejection issued in Korean Application No. 2013-7020373.
Nov. 11, 2014 Notification of Reason(s) for Refusal issued in Japanese Application No. 2014-018947.
Jul. 23, 2014 Submission of Publications and the Like submitted in Japanese Application No. 2012-181768.
Jul. 23, 2014 Submission of Publications and the Like submitted in Japanese Application No. 2013-89503.
Jul. 30, 2014 Decision on Rejection issued in Chinese Application No. 201110129612.7.
Aug. 28, 2014 Notice of Grounds for Rejection issued in Korean Application No. 2014-7013283.
Sep. 9, 2014 Notification of Reasons for Refusal issued in Japanese Application No. 2013-215621.
Aug. 27, 2014 Notice of Final Rejection issued in Korean Application No. 2009-7021086.
Jul. 31, 2014 Taiwanese Office Action issued in Taiwanese Application No. 102118596.
Sep. 30, 2014 Notice of Grounds for Rejection issued in Korean Application No. 2009-7020757.
Sep. 30, 2014 Notification of Reasons for Refusal issued in Japanese Application No. 2013-089503.
Dec. 16, 2013 Notice of Grounds for Rejection issued in Korean Application No. 2009-7020498.
Sep. 29, 2014 Notice of Final Rejection issued in Korean Application No. 2009-7020498.
Sep. 30, 2014 Notification of Reasons for Refusal issued in Japanese Application No. 2012-181768.
Jul. 1, 2014 Office Action issued in Japanese Patent Application No. 2008-100891.
Oct. 3, 2011 Office Action issued in Japanese Patent Application No. 2008-98342.
Oct. 21, 2011 Office Action issued in Korean Patent Application No. 2010-7000882.
Mar. 21, 2012 Japanese Office Action issued in Japanese Patent Application No. 2012-048220.
Mar. 21, 2012 Japanese Office Action issued in Japanese Patent Application No. 2008-096150.
Mar. 21, 2012 Japanese Office Action issued in JP-2008-185415.
Mar. 30, 2012 Office Action issued U.S. Appl. No. 12/452,329.
Submission of Publications and the like issued in Japanese Patent Application No. 2008-105198 dated Jul. 11, 2011.
Submission of Publications and the like submitted in Japanese Patent Application No. 2008-105198 dated Dec. 13, 2011.
Apr. 8, 2014 Submission of Publications and the like issued in Japanese Patent Application No. 2013-215621.
Feb. 15, 2015 Office Action issued in Chinese Patent Application No. 201310056745.5.
Aug. 31, 2012 Office Action issued in Korean Patent Application No. 2010-7000882.
Dec. 7, 2012 Submission of Publications and the like issued in Japanese Patent Application No. 2008-098342.
Nov. 26, 2004 Patent Grant Publication of Japanese Patent No. 3327423.
May 9, 2013 Submission of Publications and the Like issued in Japanese Patent Application No. 2008-105198.
Apr. 10, 2013 Notification of Reason(s) for Refusal issued in Japanese Patent Application No. 2008-101101.
May 15, 2013 Office Action issued in Chinese Patent Application No. 201110242574.6.
May 24, 2013 Office Action issued in Chinese Patent Application No. 200880024815.6.
Sep. 1, 2015 Office Action issued in Taiwanese Application No. 101130952.
Oct. 12, 2015 Office Action issued in European Application No. 08 740 127.9.
Oct. 12, 2015 Office Action issued in European Application No. 08 740 099.0.
Oct. 5, 2015 Office Action issued in European Application No. 08778217.3.
Oct. 6, 2015 Office Action issued in European Application No. 11 009 604.7.
Oct. 27, 2015 Office Action issued in Chinese Application No. 201310056745.5.
Oct. 22, 2015 Office Action issued in Chinese Application No. 201410025812.1.
Mar. 1, 2016 Office Action issued in Japanese Application No. 2015-104375.
Mar. 1, 2016 Office Action issued in Japnese Application No. 2015-104305.
Feb. 26, 2016 Office Action issued in Korean Application No. 2015-7001682.
Jan. 20, 2016 Office Action issued in Chinese Application No. 201310578940.4.
Jan. 15, 2016 Office Action issued in Chinese Application No. 201310328607.8.
Mar. 15, 2016 Office Action issued in Japanese Application No. 2015-112377.
May 11, 2016 Third Party Submission (A) issued in Japanese Application No. 2015-161711.
May 11, 2016 Third Party Submission (B) issued in Japanese Application No. 2015-161711.
Apr. 21, 2016 Office Action issued in Chinese Application No. 201310103458.5.
Apr. 5, 2016 Office Action issued in Japanese Application No. 2015-129846.
Jul. 5, 2016 Office Action issued in Japanese Application No. 2015-161711.
Jul. 28, 2016 Office Action issued in Chinese Application No. 201410025812.1.
Aug. 30, 2016 Office Action issued in Japanese Application No. 2015-251710.
Nov. 18, 2016 Office Action issued in European Patent Application No. 08740127.9.
Dec. 5, 2016 Extended European Search Report issued in European Patent Application No. 16001361.1.
Dec. 21, 2016 Submission of Publications and the Like issued in Japanese Patent Application No. 2015-161711.
Mar. 23, 2011 Office Action issued in Japanese Application No. 2008-105198.
Jun. 22, 2010 European Search Report issued in European Patent Application No. 08778217.3.
Jun. 20, 2012 Japanese Office Action issued in Japanese Patent Application No. 2008-098342.
"Liquefied Polyisoprene Rubber LIR;" Catalog; 2002; pp. 1-7.
May 9, 2011 Submission of Publications and the like issued in Japanese Application No. 2008-105198.
Aug. 30, 2013 Submission of Publications and the Like issued in Japanese Patent Application No. 2008-101101.
Oct. 18, 2013 Office Action issued in Korean Patent Application No. 2013-7020373.
Nov. 12, 2013 Notification of Reason(s) for Refusal issued in Japanese Patent Application No. 2008-101101.
Jan. 8, 2014 Japanese Office Action issued in Japanese Patent Application No. 2012-181768.

(56) References Cited

OTHER PUBLICATIONS

Feb. 5, 2014 Japanese Office Action issued in Japanese Patent Application No. 2013-089503.
Jan. 2, 2014 Korean Office Action issued in Korean Patent Application No. 2013-7026158.
Jan. 24, 2014 Chinese Office Action issued in Chinese Patent Application No. 201110242574.6.
Apr. 1, 2014 Decision to Dismiss the Amendment issued in Japanese Patent Application No. 2008-101101.
Apr. 1, 2014 Decision of Refusal issued in Japanese Patent Application No. 2008-101101.
Aug. 5, 2015 Office Action issued in Chinese Patent Application No. 201310103458.5.
Aug. 24, 2015 Office Action issued in Korean Patent Application No. 2009-7021192.
Mar. 13, 2017 Notification of Reasons for Refusal issued in Japanese Patent Application No. 2016-128495.
Mar. 15, 2017 Decision of Refusal issued in the Japanese Patent Application No. 2015-161711.
May 10, 2017 Summons to attend oral proceedings issued in European Patent Application No. 08778217.3.
May 11, 2017 Summons to attend oral proceedings issued in European Patent Application No. 11009604.7.
Jun. 2, 2017 Office Action issued in European Patent Application No. 08740108.9.
Jun. 7, 2017 Notification of Reason(s) for Refusal issued in Japanese Patent Application No. 2016-128496.
Jan. 19, 2017 Office Action issued in Chinese Patent Application No. 201410025812.1
Aug. 22, 2017 Office Action issued in Korean Patent Application No. 10-2017-7016187.
Aug. 18, 2017 Office Action issued in Chinese Patent Application No. 201510002749.4.
Jan. 3, 2017 Office Action issued in Chinese Patent Application No. 201310103458.5.
Nov. 20, 2017 Notification of Reasons for Refusal issued in Japanese Patent Application No. 2016-246431.

* cited by examiner

IMAGE DISPLAY DEVICE AND PRODUCTION METHOD THEREOF

CROSS-REFERENCE TO RELATED APPLICATIONS

This application is a Continuation application of U.S. patent application Ser. No. 14/260,907, filed Apr. 24, 2014, which is a Divisional application of U.S. patent application Ser. No. 12/452,275, filed on Dec. 23, 2009, which is a National Stage Application of PCT/JP2008/062866, filed on Jul. 16, 2008, and claims the benefit of Japanese Patent Application No. 2008-102051, filed on Apr. 10, 2008, Japanese Patent Application No. 2008-5027, filed on Jan. 11, 2008, and Japanese Patent Application No. 2007-186360, filed on Jul. 17, 2007. The entire disclosure of the prior applications is incorporated herein by reference.

TECHNICAL FIELD

The present invention relates to an image display device having an image display panel such as a liquid crystal display panel, and a method for producing such an image display device. More specifically, the present invention relates to an improved image display device, and production method thereof, in which a cured resin is arranged between an image display panel and a transparent protective panel.

BACKGROUND ART

In an image display device such as a liquid crystal display device, to prevent the image display panel from being damaged and to protect the surface thereof, a transparent protective panel such as a glass panel or a plastic panel is arranged on the front face of the image display panel. More specifically, for example, the protective panel is mounted inside a case with a slight gap with respect to the image display panel, by arranging a spacer or the like between the image display panel and the protective panel at the peripheral edge of the image display panel.

However, when such a configuration is employed, the gap between the image display panel and the protective panel scatters light, resulting in decreased contrast and luminance. This leads to the problem that image quality is harmed. Furthermore, in a configuration in which a gap is present, reflection occurs at the interface between the protective panel and air due to their different refractive indices, which leads to visibility problems, especially outdoors.

Based on such circumstances, it has been proposed to fill a resin between the image display panel and the protective panel. For example, in the liquid crystal display device described in Patent Document 1, a spacer is arranged on the periphery of a polarizing plate which is pasted on the surface of a liquid crystal display panel, and a surface protective glass is mounted on an upper portion of the spacer. Furthermore, the surface protective glass is mounted on the liquid crystal display panel by filling an adhesive so that air bubbles do not enter between the polarizing plate and the surface protective glass.

Patent Document 2 also describes an image display device in which an image display panel and a protective panel are closely adhered via at least one or more layers of a transparent adhesive material. Patent Document 2 describes that excellent impact resistance can be realized by having a predetermined relationship between the thickness of the transparent adhesive material and the dynamic viscoelastic properties measured based on frequency dispersion.

[Patent Document 1] Japanese Patent Application Laid-Open No. 2005-55641
[Patent Document 2] Japanese Patent Application Laid-Open No. 2003-29644

DISCLOSURE OF THE INVENTION

Problems to be Solved by the Invention

However, from the perspective of production costs and impact resistance, it is better to use a plastic panel than a glass panel for the protective panel. Glass panels cost comparatively more than plastic panels, and also have weaker impact resistance. Therefore, the use of a plastic panel formed from polymethyl methacrylate (PMMA), which is a kind of acrylic resin, as a protective panel is being investigated.

However, the use of a plastic panel as a protective panel leads to problems with the protective panel warping, which becomes a cause of display quality deterioration. For example, if a resin composition is filled between the image display panel and the plastic panel and is cured, the image display panel is subjected to stresses such as the internal stress generated due to volume shrinkage during the curing of the resin composition, the external stress generated by the plastic panel warping due to changes in the environment temperature, and the residual stress of during molding that the plastic panel itself has. When such internal, external, or residual stresses are applied on the image display panel, if the image display panel is a liquid crystal display panel, the cell gap of the liquid crystal layer fluctuates in the order of nanometers, which becomes a cause for the occurrence of image unevenness. In particular, while in some cases the size of the protective panel is made larger than the size of the image display panel, and a shielding part is provided on the peripheral portion of the protective panel, in such cases the tendency for image unevenness to occur is pronounced. Furthermore, in extreme cases, the peripheral portion of the protective panel can warp upwards, causing light leakage and the like to occur.

To suppress volume shrinkage of the resin composition filled between the image display panel and the protective panel, it has even been tried to use a resin composition having a low curing shrinkage ratio and a low elastic modulus. However, when a plastic panel is used for the protective panel, the fact remains that the results cannot always be said to be sufficient. This is because plastic panels such as a polymethyl methacrylate panel tend to warp from changes in the environment temperature (especially when exposed to high temperatures). Therefore, the resin composition tends to become hot and warp not only when the resin composition filled between the image display panel and the protective panel undergoes thermal curing, but even when such resin composition is cured by UV-ray irradiation. In addition, warping also tends to occur from the high temperatures even after curing.

The present invention was proposed in consideration of such problems in the conventional art. It is an object of the present invention to provide a configuration of an image display device capable of suppressing warping of a protective panel formed from a plastic as much as possible, and to provide a method for producing the image display device.

Means for Solving the Problems

To achieve the above objects, a first image display device according to the present invention is an image display device comprising an image display panel and a transparent protective panel formed from a plastic which are arranged facing each other via a cured resin, wherein an outer dimension of the protective panel is made larger than an outer dimension of the image display panel, and a peripheral edge of the protective panel is fixed with a fixing jig.

A first method for producing an image display device according to the present invention is a method for producing an image display device comprising the steps of arranging an image display panel and a transparent protective panel formed from a plastic to face each other via a resin composition, and curing the resin composition, wherein an outer dimension of the protective panel is made larger than an outer dimension of the image display panel, and the resin composition is cured in a state where a peripheral edge of the protective panel is fixed with a fixing jig.

A second image display device according to the present invention is an image display device comprising an image display panel and a transparent protective panel formed from a plastic which are arranged facing each other via a cured resin, wherein an outer dimension of the protective panel is substantially equal to an outer dimension of the image display panel, the outer dimension is equal to an inner dimension of a case of the protective panel and the image display panel, and substantially the whole face of the protective panel is adhered to the image display panel by the cured resin.

A second method for producing an image display device according to the present invention is a method for producing an image display device comprising the steps of arranging an image display panel and a transparent protective panel formed from a plastic to face each other via a resin composition, and curing the resin composition, wherein an outer dimension of the protective panel is substantially made equal to an outer dimension of the image display panel, the outer dimension is substantially made equal to an inner dimension of a case of the protective panel and the image display panel, and curing the resin composition in the case in a state where substantially the whole face of the protective panel is in contact with the resin composition.

In the present invention, the expression "an outer dimension of the protective panel is larger than an outer dimension of the image display panel" refers to the image display panel being included within the protective panel when in a plan view the protective panel and the image display panel are superimposed.

Advantages of the Invention

As described above, when the size of the protective panel is larger than the size of the image display panel, the occurrence of warping at the peripheral edge of the protective panel is pronounced. Therefore, in the first image display device or the method for producing the same according to the present invention, the resin composition is cured by UV-ray irradiation in a state where the peripheral edge of the protective panel is fixed using a fixing jig, and the peripheral edge is also fixed with the fixing jig even after the curing. Consequently, the resin composition can be cured in a state where warping of the protective panel is corrected, and a state in which the protective panel is not warped can be maintained.

On the other hand, in the second image display device or the second method for producing the same according to the present invention, the focus is on the size of the protective panel, the size of the image display panel, and the size of the case thereof. The resin composition is cured in a state where the outer dimension of the protective panel, the outer dimension of the image display panel, and the inner dimension of the case thereof are made substantially equal. Then, the resin composition is cured in a state where substantially the whole face of the protective panel is in contact with the resin composition. Consequently, the resin curing are not carried out in a state where the peripheral edge of the protective panel is open. In addition, just by fitting the protective panel and the image display panel in the case with the resin composition interposed therebetween, warping upwards of the protective panel can be suppressed from the side face (face in contact with the case) of the protective panel. Consequently, the resin can be uniformly cured over the whole face of the protective panel without having to take any particular fixing measures for the protective panel, and the occurrence of warping can be suppressed.

The conventional art completely fails to describe the idea of suppressing the occurrence of warping in the protective panel by making the outer dimension of the protective panel, the outer dimension of the image display panel, and the inner dimension of the case thereof substantially equal. For example, in the invention described in the above Patent Document 1, a surface protection glass is used, and absolutely no consideration is given to warping of a plastic panel. The invention of Patent Document 2 is directed to an image display device having a comparatively large screen of about 32 to 100 inches. Since the size of the protective panel is smaller than the size of the display panel, and the configuration is different from that of the present invention, the protection configuration of the image display panel cannot be produced by the simple operation of just superimposing the protective panel and the image display panel via the resin composition and fitting the resultant structure in the case.

Therefore, according to the first and second image display devices of the present invention, even though the protective panel is formed from a plastic, warping of the protective panel can be reliably suppressed, and a highly reliable image display can be obtained in which image unevenness and the like do not occur. Furthermore, according to the method for producing an image display device according to the present invention, such an image display device can be provided.

Furthermore, according to the first and second image display devices of the present invention, since a cured resin is arranged between the protective panel and the image display panel, advantageous effects from such configuration can also be obtained. For example, reflection at the interface with the protective panel can be suppressed, and sufficient outdoor visibility can also be ensured. In addition, because the cured resin is arranged between the protective panel and the image display panel, compared with when a gap is provided between these panels, sufficient impact resistance and the like can be ensured even if the clearance between the protective panel and the image display panel is thin. Therefore, the present invention is also useful in making the device thinner.

DESCRIPTION OF THE REFERENCE NUMERALS

Figure 1:
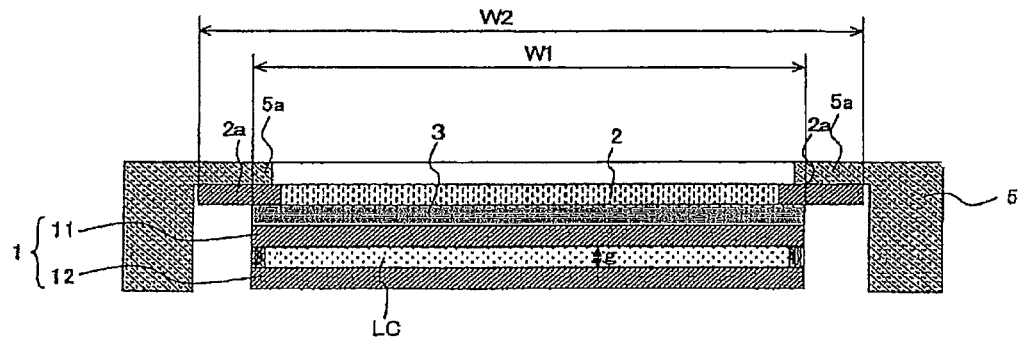
FIG. 1 is a schematic diagram of a panel configuration of a liquid crystal display device according to an embodiment of the present invention.

1 Liquid crystal display panel
2 Protective panel
2a Shielding part
3 Cured resin
4 Resin composition
5, 6 Fixing jig
5a Holding part
7 Adhesive tape
8 Case

BEST MODE FOR CARRYING OUT THE INVENTION

Embodiments of the image display device and production method thereof to which the present invention is applied will now be described with reference to the drawings using a liquid crystal display device as an example. In the drawings, same-numbered reference numerals represent the same or a similar structural element.

FIG. 1 is a schematic diagram of a panel configuration of a liquid crystal display device according to an embodiment of a first aspect of the present invention. This liquid crystal display device is used in a mobile phone, a portable game device or the like. The liquid crystal display device includes a liquid crystal display panel 1 for displaying images and a protective panel 2 for protecting the surface of the liquid crystal display panel 1. The liquid crystal display panel 1 and the protective panel 2 are arranged facing each other via a cured resin 3. Furthermore, the liquid crystal display panel 1 and protective panel 2 are respectively adhered with substantially the whole face of the surface or the back face of the cured resin 3. Consequently, the liquid crystal display device has improved visibility and impact resistance.

In the liquid crystal display panel 1, a liquid crystal layer LC is formed such that a liquid crystal material is sandwiched between a pair of substrates 11 and 12. Images are displayed by controlling the orientation of the liquid crystal material in this liquid crystal layer LC. More specifically, provided on the pair of substrates 11 and 12 are a not-illustrated color filter and black matrix, pixel electrodes and counter electrodes, as well as drive transistors and the like. A polarizing plate is pasted on the surface and back face of the pair of substrates 11 and 12. Image display is performed by controlling the drive of each pixel by an active matrix system, for example. A gap g between the pair of substrates 11 and 12 is a so-called cell gap.

Furthermore, in this image display device, a shielding part 2a is formed on the peripheral edge of the protective panel 2. The outer dimension W2 of the protective panel 2, which includes the shielding part 2a, is slightly larger than the outer dimension W1 of the liquid crystal display panel 1, so that the shielding part 2a protrudes towards the exterior side from the interior side of the peripheral edge of the liquid crystal display panel 1. Light leakage from the peripheral portion of the liquid crystal display panel 1 can be reliably shielded by the shielding part 2a.

Figure 6:
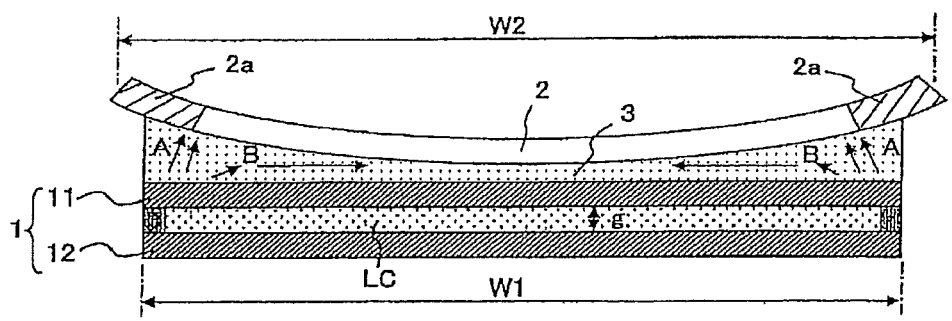
FIG. 6 is a schematic cross-sectional diagram illustrating warping of a protective panel.

Thus, when the peripheral edge of the protective panel 2 protrudes from the peripheral edge of the liquid crystal display panel 1, if the resin composition is simply arranged between these panels, and the protective panel 2 and the liquid crystal display panel 1 are pasted by curing the resin composition, as illustrated in FIG. 6, the cured resin 3 warps upwards especially at the peripheral portion of the protective panel 2 due to the internal stress (arrow A) generated during the curing of the resin composition and the external stress (arrow B) generated on the peripheral portion when the protective panel 2 warps due to changes in the environment temperature. Consequently, these stresses are applied on the upper face of the liquid crystal display panel 1. When such stresses are applied on the liquid crystal display panel 1, the gap g between the substrates 11 and 12 of the liquid crystal display panel 1 fluctuates in the order of nanometers between the center portion and the peripheral portion, for example, which may cause image unevenness to occur.

However, in the present embodiment, the curing of the resin composition is carried out in a state where the upper face of the shielding part 2a of the protective panel 2 (i.e., the face of the protective panel 2 on the opposite side of the liquid crystal display panel 1) is held on the liquid crystal display panel 1 side by a fixing jig 5. This prevents the protective panel 2 from warping during the curing, so that as little stress as possible is applied on the liquid crystal display panel 1. Furthermore, as illustrated in FIG. 1, even after the resin composition is cured, the upper face of the shielding part 2a continues to be held and fixed with the fixing jig 5. Therefore, according to the present embodiment, the peripheral edge of the protective panel 2 can be maintained in a state free from warping. A method for pasting the protective panel according to the present embodiment will now be described.

Figure 2:
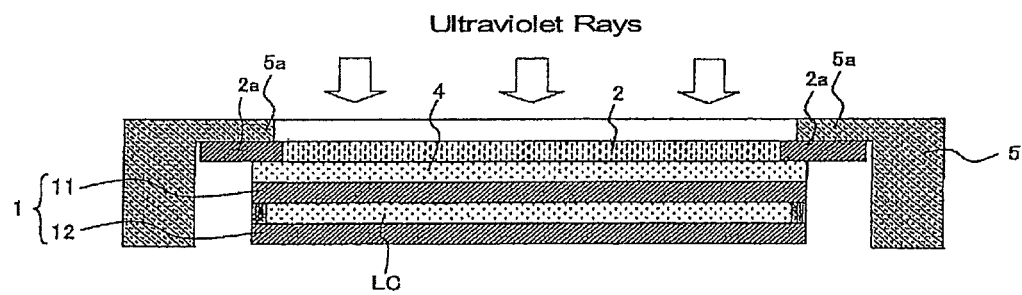
FIG. 2 is a schematic cross-sectional diagram illustrating a pasting step of a protective panel according to the embodiment illustrated in FIG. 1.

FIG. 2 illustrates the pasting step of the protective panel 2 in the method for producing the liquid crystal display device of the present embodiment. In this step, first, a resin composition 4 is coated between the liquid crystal display panel 1 and the protective panel 2. In this case, the resin composition 4 may be coated on the upper face of the liquid crystal display panel 1 and the protective panel 2 is then superimposed thereon. Conversely, the resin composition 4 may also be coated on the protective panel 2 side, and then the protective panel 2 is flipped over and is superimposed on the liquid crystal display panel 1.

Examples of the resin composition 4 to be used may include thermosetting and photocurable (for example, UV-ray curable) resin compositions. However, from the perspective of avoiding a high-temperature state during curing as much as possible, it is preferred to use a UV-ray curable or similar photocurable resin composition. In the present embodiment, a UV-ray curable resin composition is used as the resin composition 4.

Furthermore, the resin composition 4 is prepared so as to have a curing shrinkage ratio of preferably 5% or less, more preferably 4.5% or less, even more preferably 4.0% or less, and most preferably 0 to 2%. By doing so, the internal stress that builds up in the cured resin 3 during curing of the resin composition 4 can be reduced, and the generation of distortion at the interface between the cured resin 3 and the liquid crystal display panel 1, or at the interface between the cured resin 3 and the protective panel 2, can be prevented.

In addition, the resin composition 4 is prepared so that the storage modulus (25° C.) of the cured resin 3 is preferably $1 \times 10^7$ Pa or less, and more preferably of $1 \times 10^3$ Pa to $1 \times 10^6$ Pa. By doing so, the stress that is applied on the liquid crystal display panel 1 after the curing of the resin composition 4 can be reduced.

The magnitude of the internal stress that builds up in the cured resin 3 during curing of the resin composition 4 can be evaluated based on the average surface roughness of the cured resin obtained by dropping the resin composition onto a flat plate and curing the dropped resin composition. In practice, the distortion generated at the interface with the liquid crystal display panel 1 and the protective panel 2 can be ignored if, for example, a cured resin has an average surface roughness of 6.0 nm or less, preferably 5.0 nm or less, and more preferably from 1 to 3 nm. In this evaluation, the cured resin can be obtained by dropping 2 mg of the resin composition onto a glass plate forming the substrate of a liquid crystal display panel or an acrylic plate forming a protective panel and curing the resin composition by UV-ray irradiation to a 90% or higher cure ratio. In such a case, the average surface roughness of the glass plate or the acrylic plate is usually 1.0 nm or less. Therefore, the resin composition 4 used in the present invention is a resin composition which when dropped onto the glass plate or acrylic plate forming the substrate of a liquid crystal display panel and then cured, yields a cured resin having an average surface roughness in the above-described range.

The resin composition 4 also has to have excellent optical properties. For example, regarding the refractive index, it is preferred that the refractive index of the cured resin 3 formed by curing the resin composition 4 and the refractive indices of the liquid crystal display panel 1 and the protective panel 2 are equal. For example, if the substrate 11 of the liquid crystal display panel 1 is formed from optical glass, the refractive index (nD) is 1.49 to 1.50, and if the substrate is formed from hardened glass, the refractive index is about 1.55. Furthermore, if the protective panel 2 is formed from an acrylic resin, this refractive index (nD) is 1.51 to 1.52. Accordingly, the refractive index (nD) of the cured resin 3 is preferably 1.45 or more to 1.55 or less, and more preferably 1.51 or more to 1.52 or less.

In addition, regarding transparency, if the cured resin 3 is 100 µm thick, the transmittance of light in the visible wavelength region is preferably 90% or higher.

Examples of resin compositions which satisfy the above conditions include a resin composition containing at least one kind of polymer selected from a polyurethane acrylate, a polyisoprene-based acrylate or an ester thereof, a hydrogenated terpene resin, a butadiene polymer and the like; at least one kind of acrylate monomer selected from isobornyl acrylate, dicyclopentenyl oxyethyl methacrylate, 2-hydroxybutyl methacrylate and the like; and a photopolymerization initiator such as 1-hydroxycyclohexyl-phenyl-ketone. In this case, the kind and proportion of the polymer and the acrylate monomer are adjusted so that the values for the curing shrinkage ratio, storage modulus, and optical properties fall within the above-described ranges. The protective panel 2 is often provided with a function for cutting light in the UV region to protect the liquid crystal display panel 1 against UV rays. Therefore, it is preferred to combine the photopolymerization initiator with a photopolymerization initiator that can cure even in the visible region (for example, trade name: SpeedCure TPO, manufactured by Nihon SiberHegner KK).

When coating the resin composition 4 on the liquid crystal display panel 1 or the protective panel 2, a spacer is formed on the periphery of the liquid crystal display panel 1, for example, before the coating of the resin composition 4 is carried out. Obviously, the spacer may be omitted. Although the thickness of the coated resin composition 4 is arbitrary, preferably the coating is carried out so that the layer thickness of the cured resin 3 will be about 50 µm to 200 µm.

After the coating of the resin composition 4, the liquid crystal display panel 1 and the protective panel 2 are superimposed over each other with the resin composition 4 interposed therebetween. Here, the protective panel 2 is a transparent panel made of a plastic. For example, an acrylic resin panel or the like, such as a polymethyl methacrylate panel, may be used. Furthermore, in the present embodiment, the protective panel 2 has on its peripheral edge a shielding part 2a which shields light. The shielding part 2a may be formed by pasting a light-shielding tape or by printing a light-shielding coating.

The outer dimension of the protective panel 2 is larger than the outer dimension of the liquid crystal display panel 1. Therefore, when these panels are superimposed, the peripheral edge of the protective panel 2 protrudes from the peripheral edge of the liquid crystal display panel 1. If the joining with the protective panel 2 is carried out by simply irradiating UV rays in this state to cure the resin composition 4, the problem of warping of the protective panel 2 arises. Thus, in the present embodiment, as illustrated in FIG. 2, the resin composition 4 is cured in a state where the peripheral edge of the protective panel 2 is fixed using the fixing jig 5 so as to be held from the upper face of the protective panel 2.

More specifically, the fixing jig 5 may have, for example, a frame shape capable of housing in its interior the liquid crystal display panel 1 and the protective panel 2, in which the upper end portion is folded over to form an eaves-shaped holding part 5a. The resin composition 4 is cured by UV-ray irradiation in a state where the upper face of the peripheral edge of the protective panel 2, which serves as the shielding part 2a, is held by this holding part 5a. Consequently, since the curing of the resin composition 4 is carried out in a state in which the warping of the protective panel 2 is corrected, the flatness of the protective panel 2 is maintained. Furthermore, even when the resin composition is cured by UV-ray irradiation, in actual practice, the protective panel 2 is exposed to heat rays. However, as long as the shielding part 2a is fixed with the holding part 5a, the warping will not expand even if the protective panel 2 becomes hot.

Moreover, while the fixing jig 5 may be a dedicated jig used only during the curing of the resin composition 4, the case housing the liquid crystal display panel 1 on which the protective panel 2 is pasted may also be used for this purpose. The above-described held state can be obtained by forming the eaves-shaped holding part 5a in the case of the liquid crystal display device into which the liquid crystal display panel 1 and the like is to be mounted, and mounting the liquid crystal display panel 1 in the case. In this case, the case can be used as is, and the mounting of the liquid crystal display panel 1 is completed simultaneously with the completion of the curing of the resin composition 4. More specifically, the liquid crystal display device has the exact same structure as the state illustrated in FIG. 2. Furthermore, in this case, the upper face of the protective panel 2 continues to be supported and fixed with the case even after the curing of the resin composition 4, whereby the warping of the protective panel 2 over time can also be prevented.

The thus-produced liquid crystal display device is a highly reliable liquid crystal display device in which warping of the protective panel 2 is reliably suppressed, and display unevenness and the like does not occur. Furthermore, since the cured resin 3 is filled between the protective panel 2 and the liquid crystal display panel 1, outdoor visibility can be sufficiently ensured, and impact resistance can also be ensured.

Figure 3:
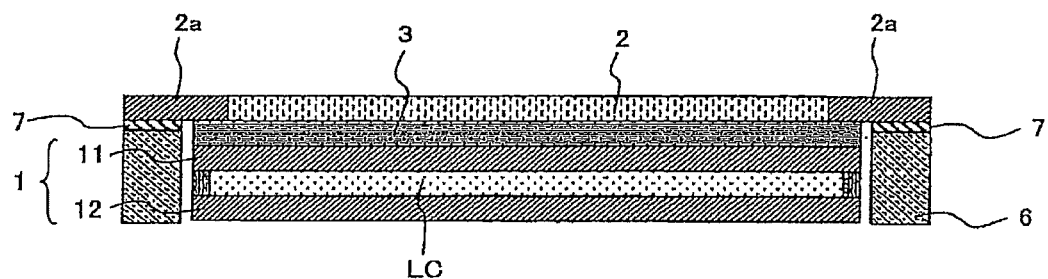
FIG. 3 is a schematic diagram of a panel configuration of a liquid crystal display device according to another embodiment of the present invention.

FIG. 3 is a schematic diagram of a panel configuration of an image display device according to another embodiment of the first aspect of the present invention. This image display device differs from the image display device illustrated in FIG. 1 in that the lower face of the peripheral edge of the protective panel 2 formed from a plastic, that is, the face on the liquid crystal display panel 1 side of the protective panel 2, is adhered and fixed to the upper end face of a fixing jig 6. Other features are formed in the same manner as the image display device illustrated in FIG. 1.

Figure 4:
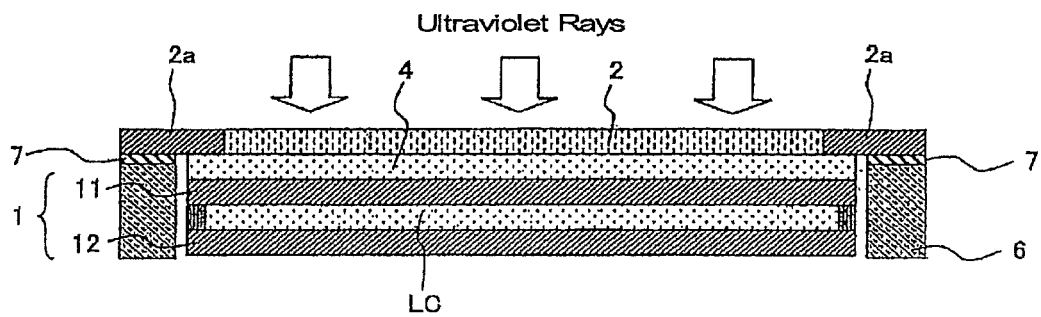
FIG. 4 is a schematic cross-sectional diagram illustrating a pasting step of a protective panel according to the embodiment illustrated in FIG. 3.

The pasting method of the protective panel 2 in this embodiment is, similar to as described above, to coat the liquid crystal display panel 1 with the resin composition 4 and then superimpose the protective panel 2 over the liquid crystal display panel 1 with the resin composition 4 interposed therebetween. At this stage, as illustrated in FIG. 4, a frame-shaped fixing jig 6 having roughly the same outer dimension as the protective panel 2 is used. The peripheral edge of the protective panel 2 is fixed with the upper end face of this fixing jig 6. For example, the protective panel 2 is adhesively fixed by pasting an adhesive tape 7 on the upper end face of the fixing jig 6. If the resin composition 4 is cured by carrying out the UV-ray irradiation in this state, similar to in the embodiment of FIG. 1, the warping of the protective panel 2 can be reliably suppressed.

In the present embodiment too, the fixing jig 6 may be a dedicated jig used only during the curing of the resin composition 4, or the case housing the liquid crystal display panel 1 may also be used for this purpose. In the latter case, the liquid crystal display device has the exact same structure as the state illustrated in FIG. 3.

Figure 5:
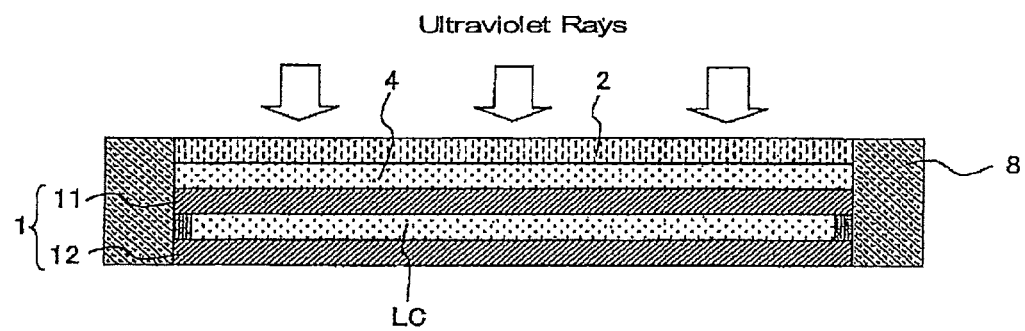
FIG. 5 is a schematic cross-sectional diagram illustrating a pasting step of a protective panel in a liquid crystal display device according to another embodiment of the present invention.

FIG. 5 is a schematic diagram of a method for producing a panel configuration of a liquid crystal display device according to an embodiment of a second aspect of the present invention. The present embodiment is characterized in that the outer dimension of the protective panel 2 is made substantially the same as the outer dimension of the liquid crystal display panel 1, the outer dimensions of these panels are made substantially the same as the inner dimension of the case 8 thereof, and the curing of the resin composition 4 is carried out in a state where the resin composition 4 is in contact with substantially the whole surface of the protective panel 2. Furthermore, in the present embodiment also, the method is the same as that of the above embodiments according to the first aspect of the present invention as far as the coating of the resin composition 4. Thus, such a description is omitted here.

As described above, after coating the resin composition 4 on the liquid crystal display panel 1, the protective panel 2 is superimposed thereon. However, as illustrated in FIG. 5, at this stage the outer dimension of the protective panel 2 is made substantially the same as the outer dimension of the liquid crystal display panel 1. Consequently, the whole face of the protective panel 2 contacts the resin composition 4, and is in a so-called "warping margin-less" state. In this state, the liquid crystal display panel 1 and the protective panel 2 are housed in the case 8. Here, the inner dimension of the case 8 is set to be substantially the same as the outer dimension of the protective panel 2 and the liquid crystal display panel 1, and so that the protective panel 2 superimposed on the liquid crystal display panel 1 fits precisely in the case 8. In this state, if the curing of the resin composition 4 is carried out by irradiating UV rays, the warping of the protective panel 2 can be simply and reliably suppressed. This is because there are no protruding portions of the protective panel 2 where warping becomes pronounced, and the warping upwards of the protective panel 2 is suppressed by the case 8 which abuts a side face of the protective panel 2. Furthermore, in the present embodiment, the shielding part has to be separately provided.

Although embodiments of the present invention were described above, the present invention is obviously not limited to those embodiments. Various modifications may be made to the embodiments discussed above without departing from the scope of the present invention. For example, the shielding part may be omitted on the peripheral edge of the protective panel. Furthermore, while the above-described embodiments all apply the present invention in a liquid crystal display device, the present invention may also be applied in a device other than a liquid crystal display device. For example, the present invention may also be applied in an organic EL display device, a plasma display and the like.

EXAMPLES

Next, more specific examples of the present invention will be described based on experiment results.

Example 1

A protective panel was pasted on a liquid crystal display panel according to the method illustrated in FIG. 2 to produce a liquid crystal display device. The used protective panel was a transparent plastic panel formed from polymethyl methacrylate (PMMA). A case housing the liquid crystal display panel was used as a fixing jig. An upper face of a light shielding part formed on a peripheral edge of the protective panel was held and fixed with forming an eaves-shaped holding part on this case.

The resin composition to be arranged between the liquid crystal display panel and the protective panel was prepared by kneading in a kneader 70 parts by weight of an ester compound formed from a maleic anhydride adduct of a polyisoprene polymer and 2-hydroxyethyl methacrylate, 30 parts by weight of dicyclopentenyl oxyethyl methacrylate, 10 parts by weight of 2-hydroxybutyl methacrylate, 30 parts by weight of a hydrogenated terpene resin, 140 parts by weight of a butadiene polymer, 4 parts by weight of a photopolymerization initiator, and 0.5 parts by weight of a visible region photopolymerization initiator.

The curing shrinkage ratio of this resin composition was 1.8%, and the storage modulus (25° C.) of the cured resin obtained by curing this resin composition was $1\times10^4$ Pa. Furthermore, the average surface roughness of the cured resin obtained by dropping 2 mg of the resin composition onto a glass plate for a liquid crystal cell, and curing the resin composition by UV-ray irradiation at a cure ratio of 90% or higher, was 2.7 nm. In addition, the transmittance in the visible region of a 100 μm-thick cured resin formed from the above resin composition was measured by a UV-Visible Spectrophotometer (model name: V-560, manufactured by JASCO Corporation) to be 90% or higher.

For the storage modulus, the elastic modulus (Pa) (25° C.) was measured at a measurement frequency of 1 Hz using a viscoelastometer (model name: DMS6100, manufactured by Seiko Instruments Inc.).

The curing shrinkage ratio was determined by measuring the specific gravities of the uncured resin solution and the cured solid using an electronic densimeter (model name:

SD-120L, manufactured by Mirage), and calculating the difference between them from the following equation.

Curing shrinkage ratio (%)=(Cured product specific gravity−Resin solution specific gravity)/Cured product specific gravity×100

The average surface roughness was determined by measuring the distortion (Ra: average surface roughness) in a given region (2.93 mm×2.20 mm) of a glass plate surface using a three-dimensional non-contact surface roughness meter manufactured by Zygo Corporation.

According to the present example, a liquid crystal display device could be obtained which had hardly any warping of the protective panel, no display unevenness, and excellent outdoor visibility and impact resistance.

Example 2

A liquid crystal display device was produced in the same manner as in Example 1, except that the resin composition to be arranged between the liquid crystal display panel and the protective panel was changed as follows. In the present example too, a liquid crystal display device could be obtained which had hardly any warping of the protective panel, no display unevenness, and excellent outdoor visibility and impact resistance.

More specifically, the resin composition in the present example was prepared by kneading in a kneader 100 parts by weight of an ester compound formed from a maleic anhydride adduct of a polyisoprene polymer and 2-hydroxyethyl methacrylate, 30 parts by weight of dicyclopentenyl oxyethyl methacrylate, 10 parts by weight of 2-hydroxybutyl methacrylate, 30 parts by weight of a hydrogenated terpene resin, 210 parts by weight of a butadiene polymer, 7 parts by weight of a photopolymerization initiator, and 1.5 parts by weight of a visible region photopolymerization initiator.

The curing shrinkage ratio of this resin composition was 1.0%, and the storage modulus (25° C.) of a cured resin obtained by curing this resin composition was $4 \times 10^3$ Pa. Furthermore, the average surface roughness of the cured resin obtained by dropping 2 mg of the resin composition onto a glass plate for a liquid crystal cell, and curing the resin composition by UV-ray irradiation at a cure ratio of 90% or higher, was 1.5 nm. In addition, the transmittance in the visible region of a 100 μm-thick cured resin formed from this resin composition was measured by a UV-Visible Spectrophotometer (model name: V-560, manufactured by JASCO Corporation) to be 90% or higher.

Example 3

A liquid crystal display device was produced in the same manner as in Example 1, except that the resin composition to be arranged between the liquid crystal display panel and the protective panel was changed as follows. In the present example too, a liquid crystal display device could be obtained which had hardly any warping of the protective panel, no display unevenness, and excellent outdoor visibility and impact resistance.

More specifically, the resin composition in the present example was prepared by kneading in a kneader 70 parts by weight of an ester compound formed from a maleic anhydride adduct of a polyisoprene polymer and 2-hydroxyethyl methacrylate (trade name: UC-203, manufactured by Kuraray Co., Ltd.), 30 parts by weight of dicyclopentenyl oxyethyl methacrylate (trade name: FA512M, manufactured by Hitachi Chemical Co., Ltd.), 10 parts by weight of 2-hydroxybutyl methacrylate (trade name: Light Ester HOB, manufactured by Kyoeisha Chemical Co., Ltd.), 30 parts by weight of a hydrogenated terpene resin (trade name: Clearon P-85, manufactured by Yasuhara Chemical Co., Ltd.), 35 parts by weight of a butadiene polymer (trade name: Polyoil 110, manufactured by Zeon Corporation), 5 parts by weight of a photopolymerization initiator trade name Irgacure 184D, manufactured by Ciba Specialty Chemicals Inc.), and 2 parts by weight of a visible region photopolymerization initiator (trade name Speed Cure TPO, manufactured by Nihon SiberHegner KK).

The curing shrinkage ratio of this resin composition was 3.8%, and the storage modulus (25° C.) of a cured resin obtained by curing this resin composition was $4 \times 10^5$ Pa. Furthermore, the average surface roughness of the cured resin obtained by dropping 2 mg of the resin composition onto a glass plate for a liquid crystal cell, and curing the resin composition by UV-ray irradiation at a cure ratio of 90% or higher, was 5.0 nm. In addition, the transmittance in the visible region of a 100 μm-thick cured resin formed from this resin composition was measured by a UV-Visible Spectrophotometer (model name: V-560, manufactured by JASCO Corporation) to be 90% or higher.

Example 4

A liquid crystal display device was produced using the same protective panel as in Example 1, by pasting the protective panel on the liquid crystal display panel according to the method illustrated in FIG. 3. The used resin composition was also the same as that in Example 1.

In the present example too, a liquid crystal display device could be obtained which had hardly any warping of the protective panel, no display unevenness, and excellent outdoor visibility and impact resistance.

Example 5

A liquid crystal display device was produced using the same protective panel as in Example 1, by pasting the protective panel on the liquid crystal display panel according to the method illustrated in FIG. 3. The used resin composition was the same as that in Example 2.

In the present example too, a liquid crystal display device could be obtained which had hardly any warping of the protective panel, no display unevenness, and excellent outdoor visibility and impact resistance.

Example 6

A liquid crystal display device was produced using the same protective panel as in Example 1, by pasting the protective panel on the liquid crystal display panel according to the method illustrated in FIG. 3. The used resin composition was the same as that in Example 3.

In the present example too, a liquid crystal display device could be obtained which had hardly any warping of the protective panel, no display unevenness, and excellent outdoor visibility and impact resistance.

Example 7

A liquid crystal display device was produced using the same protective panel as in Example 1, by carrying out the resin curing during the pasting of the protective panel according to the method illustrated in FIG. 5. The used resin composition was the same as that in Example 1. In the present example too, a liquid crystal display device could be obtained which had hardly any warping of the protective panel, no display unevenness, and excellent outdoor visibility and impact resistance.

Example 8

A liquid crystal display device was produced using the same protective panel as in Example 1, by carrying out the resin curing during the pasting of the protective panel according to the method illustrated in FIG. 5. The used resin composition was the same as that in Example 2. In the present example too, a liquid crystal display device could be obtained which had hardly any warping of the protective panel, no display unevenness, and excellent outdoor visibility and impact resistance.

Example 9

A liquid crystal display device was produced using the same protective panel as in Example 1, by carrying out the resin curing during the pasting of the protective panel according to the method illustrated in FIG. 5. The used resin composition was the same as that in Example 3. In the present example too, a liquid crystal display device could be obtained which had hardly any warping of the protective panel, no display unevenness, and excellent outdoor visibility and impact resistance.

The invention claimed is:

1. A method for producing an image display device comprising arranging an image display panel and a transparent protective panel formed from a plastic to face each other via a resin composition, and curing the resin composition,
wherein an outer dimension of the protective panel is larger than an outer dimension of the image display panel, and the resin composition is cured in a state where a peripheral edge of the protective panel is fixed with a fixing jig,
the protective panel has a shielding part on the peripheral edge thereof, the shielding part being fixed with the fixing jig,
the fixing jig is a case, and the upper end portion thereof is folded over to form an eaves-shaped holding part,
the holding part is formed so as to become smaller than the width of the shielding part,
an upper face of the peripheral edge of the protective panel is held by the case,
wherein a cured resin formed by curing the resin composition has a first refractive index, the liquid crystal display panel has a second refractive index, the protective panel has a third refractive index, and
the first refractive index, the second refractive index and the third refractive index are equal to each other.

2. The method according to claim 1, wherein the resin composition is cured in a state where the shielding part is between the holding part and the resin composition and protrudes beyond a peripheral edge of the image display panel.

3. The method according to claim 1, wherein the resin composition is cured while a lower face of the peripheral edge of the protective panel is fixed with the case.

4. The method according to claim 1, wherein the resin composition is cured by UV-ray irradiation.

5. The method according to claim 1, wherein the resin composition has a curing shrinkage ratio of 5% or lower and a cured resin thereof has a storage modulus at 25° C. of $1\times10^7$ Pa or lower.

6. The method according to claim 1, wherein the resin composition contains at least one kind of polymer selected from the group consisting of a polyurethane acrylate, a polyisoprene-based acrylate or an ester thereof, a hydrogenated terpene resin, and a butadiene polymer; at least one kind of acrylate monomer selected from the group consisting of isobornyl acrylate, dicyclopentenyl oxyethyl methacrylate, and 2-hydroxybutyl methacrylate; and a photopolymerization initiator.

7. The method according to claim 1, wherein the fixing jig prevents the protective panel from warping.

8. A method for producing an image display device comprising arranging an image display panel and a transparent protective panel formed from a plastic to face each other via a resin composition, and curing the resin composition,
wherein an outer dimension of the protective panel is substantially equal to an outer dimension of the image display panel, the outer dimension is substantially equal to an inner dimension of a case of the protective panel and the image display panel, and the resin composition is cured in the case in a state where a substantially whole face of the protective panel is in contact with the resin composition,
the protective panel has a shielding part on the peripheral edge thereof, the shielding part being fixed with a fixing jig,
the fixing jig is a case, and the upper end portion thereof is folded over to form an eaves-shaped holding part,
the holding part is formed so as to become smaller than the width of the shielding part,
an upper face of the peripheral edge of the protective panel is held by the case,
wherein a cured resin formed by curing the resin composition has a first refractive index, the liquid crystal display panel has a second refractive index, the protective panel has a third refractive index, and
the first refractive index, the second refractive index and the third refractive index are equal to each other.

9. The method according to claim 8, wherein the resin composition is cured by UV-ray irradiation.

10. The method according to claim 8, wherein the resin composition has a curing shrinkage ratio of 5% or lower and a cured resin thereof has a storage modulus at 25° C. of $1\times10^7$ Pa or lower.

11. The method according to claim 8, wherein the resin composition contains at least one kind of polymer selected from the group consisting of a polyurethane acrylate, a polyisoprene-based acrylate or an ester thereof, a hydrogenated terpene resin, and a butadiene polymer; at least one kind of acrylate monomer selected from the group consisting of isobornyl acrylate, dicyclopentenyl oxyethyl methacrylate, and 2-hydroxybutyl methacrylate; and a photopolymerization initiator.

12. The method according to claim 8, wherein the case prevents the protective panel from warping.

* * * * *